June 12, 1934.　　　G. K. GRABBE　　　1,962,271
FREE SHIFT TRANSMISSION
Filed March 23, 1933　　5 Sheets-Sheet 1

Inventor
G. K. Grabbe.
By Lacey & Lacey,
Attorneys

June 12, 1934.　　G. K. GRABBE　　1,962,271
FREE SHIFT TRANSMISSION
Filed March 23, 1933　　5 Sheets-Sheet 2

Fig. 2.

Inventor
G. K. Grabbe.
Lacey & Lacey, Attorneys

June 12, 1934.  G. K. GRABBE  1,962,271
FREE SHIFT TRANSMISSION
Filed March 23, 1933   5 Sheets-Sheet 3

Inventor
G. K. Grabbe.
By Lacey & Lacey,
Attorneys

June 12, 1934.  G. K. GRABBE  1,962,271
FREE SHIFT TRANSMISSION
Filed March 23, 1933  5 Sheets-Sheet 4

Inventor
G. K. Grabbe.
By Lacey & Lacey,
Attorneys

June 12, 1934.  G. K. GRABBE  1,962,271
FREE SHIFT TRANSMISSION
Filed March 23, 1933   5 Sheets-Sheet 5

Inventor
G. K. Grabbe.
By Lacey & Lacey,
Attorneys

Patented June 12, 1934

UNITED STATES PATENT OFFICE 1,962,271

FREE SHIFT TRANSMISSION

George K. Grabbe, Libertyville, Ill.

Application March 23, 1933, Serial No. 662,331

14 Claims. (Cl. 74—336.5)

This invention relates to an improved free shift transmission for motor vehicles and seeks, among other objects, to provide a mechanism wherein the speed gears may be selectively rendered active or inactive automatically for increasing or decreasing the speed of the vehicle.

A further object of the invention is to provide a mechanism wherein the automatic selection of the speed gears will be controlled by the speed of rotation of the driven shaft of the mechanism and will thus be dependent upon the speed of the vehicle and independent of engine speed.

Another object of the invention is to provide a mechanism wherein the speed gears may be selectively rendered active manually.

Still another object of the invention is to provide a mechanism wherein the low, second and high speed gears will embody a free wheeling clutch so that the vehicle may free wheel.

A further object of the invention is to provide a mechanism wherein the free wheeling clutch of the second speed gear and the free wheeling clutch of the high speed gear may, when so desired, be selectively rendered inactive manually.

And the invention seeks, as a still further object, to provide a mechanism which will be compact and durable and characterized by structural simplicity.

Other and incidental objects of the invention, not specifically mentioned in the foregoing, will be apparent during the course of the following description.

In the accompanying drawings forming part of this application.

Figures 1, 16:
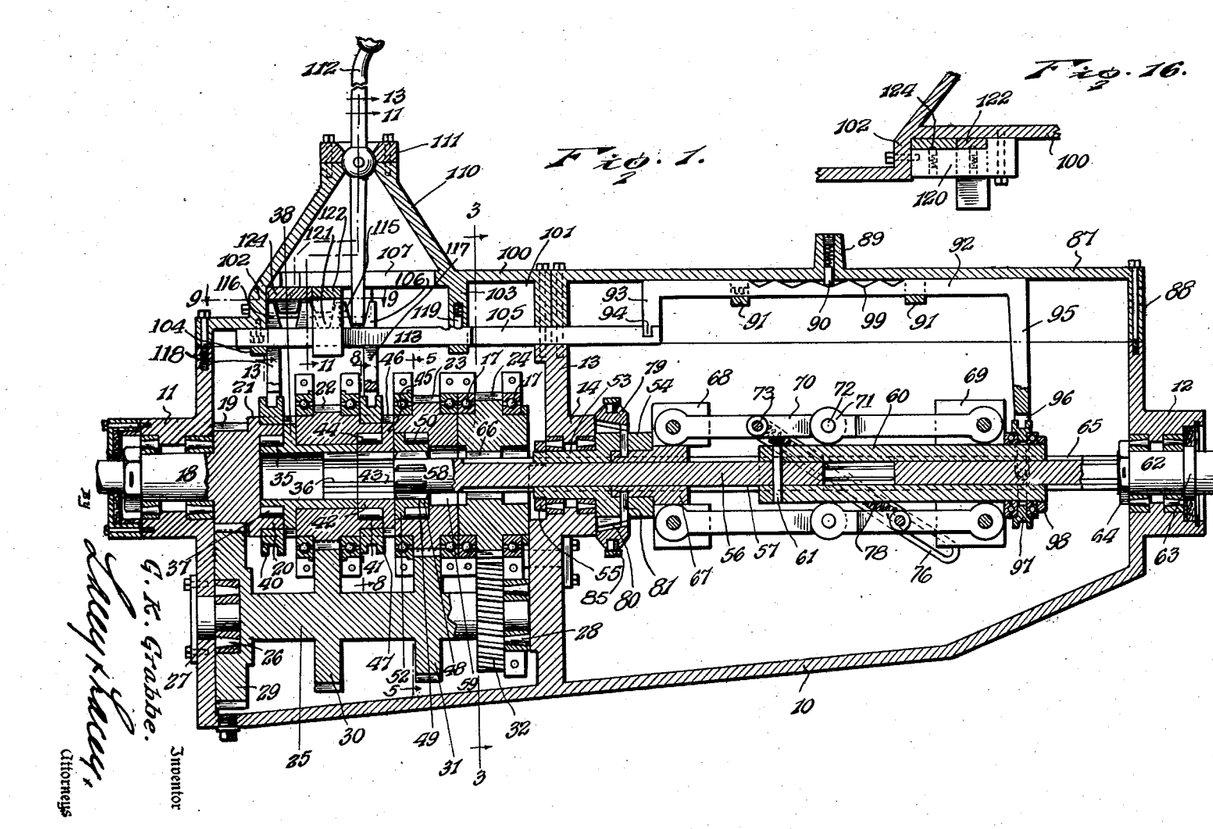
Figure 1 is a vertical longitudinal sectional view taken medially through my improved transmission.
Fig. 16 is a detail sectional view showing the mounting of the brackets which support the dogs shown in Fig. 15.
Figure 2:
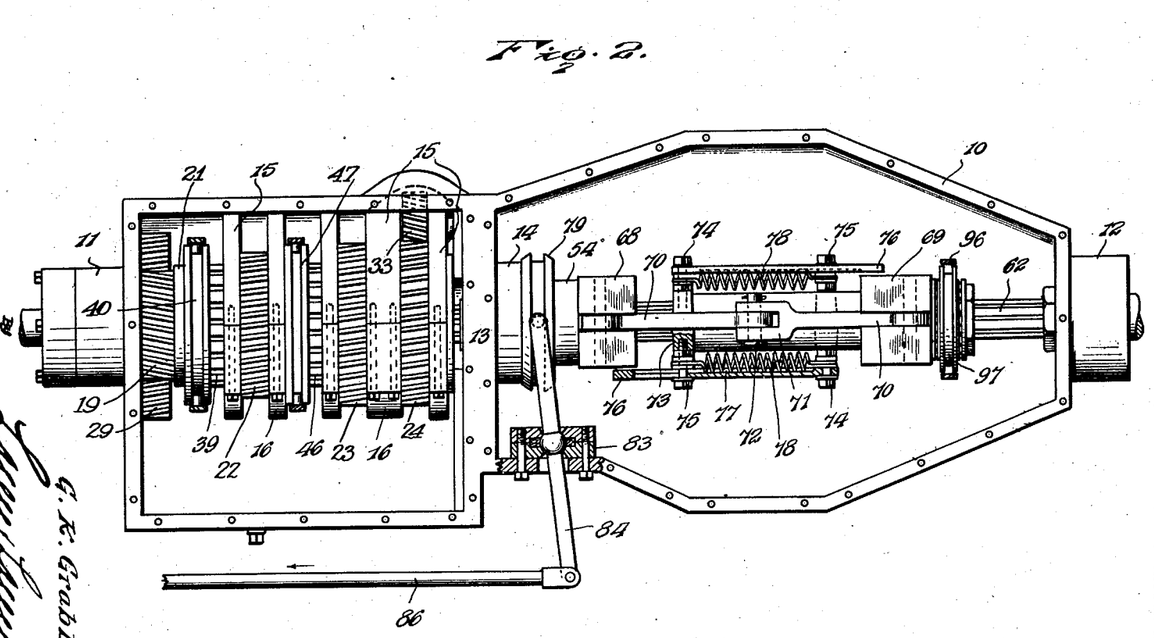
Fig. 2 is a plan view of the transmission, the covers being removed.

In carrying the invention into effect, I employ an oblong casing 10 on the front and back walls of which are formed alined bearing sleeves 11 and 12, respectively, and extending transversely of the forward end portion of the casing is a partition 13 carrying a bearing sleeve 14 alining with the sleeves 11 and 12. Extending into the forward end portion of the casing from one side wall thereof, as particularly seen in Fig. 2, are spaced bearing brackets 15 all parallel to the partition 13, and detachably connected to said brackets are bearing caps 16 retaining a plurality of ball bearings 17, as best seen in Fig. 1.

Figure 3:
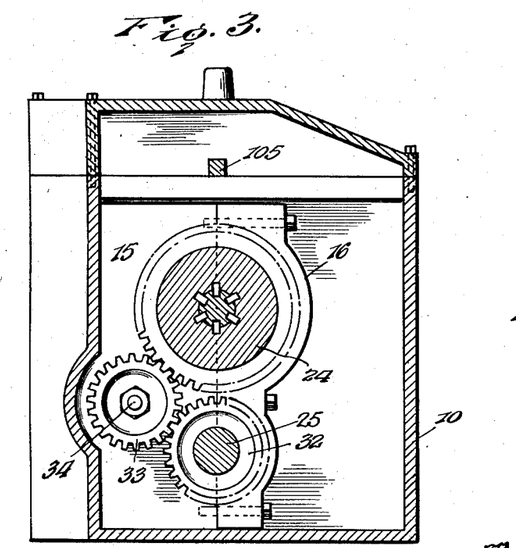
Fig. 3 is a transverse sectional view on the line 3—3 of Figure 1.

Journaled through suitable bearings in the sleeve 11 is a drive shaft 18 the inner end of which carries a high speed gear 19 and projecting from the rear face of said gear is a concentric annular hub flange 20, at the base of which is an annular stop shoulder 21. Alining with the gear 19 is a second speed gear 22, a low speed gear 23 and a reverse gear 24, the ends of the hubs of which are journaled by the bearings 17. Mounted below the shaft 18, in a plane therewith, is a countershaft 25 journaled at its forward end by a suitable bearing 26 carried by a stub 27 fixed to the front wall of the casing and at its rear end by a similar bearing 28 which, as seen in Fig. 3, is carried by the rearmost bearing bracket 15. The countershaft 25 carries a gear 29 constantly meshing with the gear 19, a gear 30 constantly meshing with the second speed gear 22, a gear 31, constantly meshing with the low speed gear 23, and a gear 32 which, as seen in Fig. 3, meshes with an intermediate gear 33 which, in turn, is constantly in mesh with the reverse gear 24. Extending through the partition 13 and through the rearmost bearing bracket 15 is a stub shaft 34 which preferably carries a suitable roller bearing journaling the gear 33. Thus, as will be seen, all of the gears will be constantly in mesh, rearward thrust of the gears 22, 23 and 24 being sustained by the partition 13 while forward thrust of these gears as well as forward and rear thrust of the gear 19 will be sustained by the tapered roller bearings in the sleeve 11.

Figure 5:
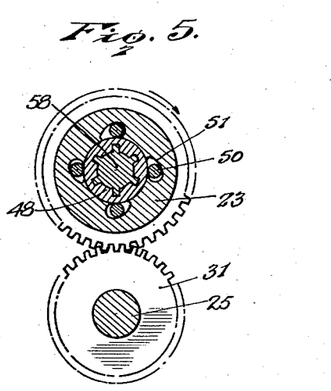
Fig. 5 is a detail section on the line 5—5 of Fig. 1.

Rotatably fitting within the hub of the gear 22 is a free wheeling clutch sleeve 35 the rear end of which is provided with internal splined grooves, as indicated at 36. This sleeve projects concentrically within the flange 20 of the gear 19 and interposed between the forward end of the sleeve and said flange are free wheeling clutch rollers 37 mounted, in the manner as shown in Fig. 5, in suitable pockets in said flange. Extending from the sleeve 35 is an annular flange 38 lying between the flange 20 of the gear 19 and the adjacent end of the hub of the gear 22, and formed on the periphery of the flange 38, as best seen in Fig. 2, are teeth 39. The outer periphery of the flange 20 is provided with similar teeth and slidable on said flange is a locking ring 40 grooved at its outer periphery and provided at its inner periphery with teeth to mesh with the teeth of the flange as well as mesh with the teeth 39 of the flange 38. Consequently, as will be seen, when the ring 40 is in its forward position abutting the shoulder 21, as shown in Fig. 1, the free wheeling clutch provided by the sleeve 35 and rollers 37 may function so that the sleeve may rotate independently of the gear 19 to permit free wheeling when in high gear. By shifting the ring 40 rearwardly, however, to engage the teeth 39 of the flange 38, the sleeve 35 and gear 19 will be locked to turn in unison whereby the free wheeling clutch of the high speed gear will be rendered inactive.

Formed on the rear end of the second speed gear 22 is a concentric hub flange 41 and rotatably fitting within said flange is a free wheeling clutch sleeve 42 having internal splined grooves 43. Interposed between the sleeve and the flange 41 are free wheeling clutch rollers 44 like the rollers 37 and mounted in similar manner. Extending from the rear end of the sleeve is an annular flange 45 lying between the flange 41 and the adjacent end of the gear 23, and formed on the flange 45, at its periphery, are teeth 46. The flange 41 of the gear 22 is provided externally with similar teeth and slidable on said flange is a locking ring 47 grooved externally and provided internally with teeth to mesh with the teeth of the flange, as well as with the teeth 46. Thus, as will be seen, when the locking ring is in its forward position, as shown in Fig. 1, the clutch sleeve 42 may turn independently of the gear 22 to permit free wheeling when in second gear. When the ring 47 is shifted rearwardly, however, to engage the teeth 46 of the flange 45, the gear 22 and clutch sleeve 42 will be locked to turn in unison so that the free wheeling clutch provided by the sleeve 42 and rollers 44 will be rendered inactive.

Rotatably fitting within the forward end of the low speed gear 23 is a free wheeling clutch sleeve 48 provided with internal splined grooves 49. Mounted to coact with said sleeve, as seen in Fig. 5, are free wheeling clutch rollers 50 accommodated in suitable tapered pockets 51 in the gear hub, and formed on the sleeve, at its forward end, is an annular flange 52 abutting the flange 45 of the sleeve 42 and resisting forward displacement of the rollers 50. As will be observed, the sleeve 48 may rotate independently of the gear 23 to permit free wheeling in low gear while, however, when the speed of rotation of said gear exceeds the speed of rotation of the clutch sleeve, the free wheeling clutch provided will function to drive the clutch sleeve. No means are provided for rendering the low speed free wheeling clutch inactive.

Figures 6, 7, 8:
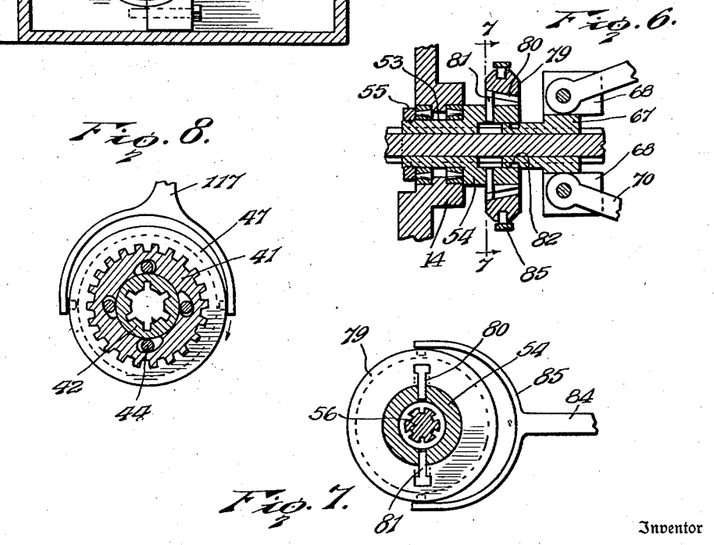
Fig. 6 is a detail section showing the releasable anchoring means for the slidable governor collar employed.
Fig. 7 is a detail section on the line 7—7 of Fig. 6.
Fig. 8 is a detail section on the line 8—8 of Fig. 1.

Journaled through suitable bearings in the sleeve 14, as particularly seen in Figs. 1 and 6, is an anchoring sleeve 53 provided at its rear end with an annular head 54, and screwed upon the forward end of the sleeve is a nut 55 turned home against the partition 13 and holding the sleeve against endwise movement. The sleeve is internally splined and slidable axially therethrough is a key shaft 56 which is provided with longitudinal grooves 57 to accommodate the splines of said sleeve. At its forward end, the shaft 56 is provided with a splined head 58 selectively engageable in the spline grooves 36, 43 and 49 of the clutch sleeves 35, 42 and 48 respectively and it is now to be observed that the gears 23 and 24 are cut away internally to provide a recess 59 adapted to freely accommodate said head, in which position the key shaft of the mechanism will be in neutral. Splined to fit over the rear end of the shaft 56 is a sleeve 60 and securing the sleeve against endwise movement on the shaft is a pin 61. Journaled through suitable bearings in the sleeve 12 on the back wall of the casing 10 is a driven shaft 62 secured against endwise movement by a collar 63 and nut 64. The forward end of this shaft projects into the casing in alinement with the key shaft 56 and is grooved, as shown at 65, to slidably receive the sleeve 60 thereover, the splines of the sleeve engaging the grooves of the shaft to provide a driving connection between the parts. Similarly, the hub of the reverse gear 24 is provided with internal grooves 66 adapted to receive the splined head 58 of the key shaft 56 and provide a driving connection between the shaft and the gear.

Splined on the key shaft 56 is a sleeve 67 the forward end of which is adapted to slidably fit into the head 54 of the sleeve 53, and formed on the rear end of said sleeve 67 are parallel wings 68. Formed on the rear end portion of the sleeve 60 are similar parallel wings 69 and pivoted at their ends to the wings 68 and 69 are jointed governor arms 70 corresponding sections of which are provided, as seen in Fig. 2, with yokes 71 to freely receive the adjacent ends of the opposite corresponding sections of the arms and are apertured to accommodate pins 72 connecting the sections. The pins and yokes provide weights centrally of the arms. At opposite sides thereof, the yoke-carrying section of one arm and the opposite section of the other arm are provided with alined bosses 73 which receive cap bolts, indicated for convenience at 74 and 75, respectively. Pivoted on the bolts 74 are oppositely inclined stop plates 76 slotted longitudinally to slide on the bolts 75, these plates being adapted to limit the opening movement of the governor arms. The plates are channeled at their inner sides, as indicated at 77, and connected at their ends to the bolts 74 and 75, at opposite sides of the governor arms, are contractile springs 78 lying in said channels. These springs will normally hold the governor arms collapsed, when the sections thereof will be disposed in alinement, as seen in Fig. 1, and, as will be observed, the stop plates 76 will prevent centrifugal lateral distortion of the springs when the governor is rotated.

Slidable on the head 54 of the sleeve 53 is a cam ring 79, best seen in Figs. 1, 6 and 7 of the drawings. This ring is externally grooved and is provided internally, at diametric points, with T-shaped cam slots 80 inclining towards the axis of the ring from the front face thereof to the rear face of the ring. Slidably received in said slots are T-shaped locking pins 81 which pass through suitable radial openings in the head 54, the heads of the pins being engaged in longitudinal slots 80 in the tapered bore of the cam ring.

Formed in the sleeve 67 of the governor to accommodate the inner ends of said pins are sockets 82.

Mounted upon one side wall of the casing, immediately at the rear of the partition 13, as seen in Fig. 2, is a bearing 83, and extending into the casing is a lever 84 mounted to rock in said bearing, being provided at its inner end, as seen in Fig. 7, with a yoke 85, the pins of which freely engage in the external groove of the cam ring 79. Attached to the outer end of said lever is a rod 86 which, at its forward end, is connected in any suitable manner with the clutch pedal of the vehicle so that when the clutch pedal is depressed for disengaging or releasing the vehicle clutch, the outer end of the lever 84 will be rocked forwardly, said lever being preferably actuated during the last portion of the throw of the clutch pedal.

In Fig. 1 of the drawings, the transmission is shown in low gear, the head 58 of the key shaft 56 being engaged with the clutch sleeve 48 so that power will be transmitted from the shaft 18 through the gears 19 and 29, the countershaft 25, the gears 31 and 23, and the clutch sleeve 48 to the key shaft 56. From the key shaft, the power will be transmitted through the sleeve 60 to the driven shaft 62 for rotating the driven shaft. Should the momentum of the vehicle cause the driven shaft and consequently the key shaft 56 to be rotated faster than the gear 23, the free wheeling clutch of said gear would operate, as previously explained, to permit free wheeling of the vehicle.

Normally, the cam ring 79 stands at the limit of its forward movement, as shown in Fig. 1, abutting the bearing sleeve 14 and having the pins 81 at the low ends of the slots 80 and consequently projecting into the head 54 of the sleeve 53 to engage in the sockets 82 of the clutch sleeve 67. Accordingly, this clutch sleeve is connected by said pins to the sleeve 53 and is thus anchored against endwise movement. Accordingly, when the key shaft 56 is rotated, and the governor arms tend to swing outwardly, said arms will exert a forward endwise pull on the sleeve 60 and consequently on the key shaft 56, tending to shift said shaft forwardly.

Assuming, therefore, that the vehicle is traveling in low speed and the vehicle engine is accelerated, the torsional strain exerted by the clutch sleeve 48 on the head 58 of the key shaft will tend to hold said shaft against forward movement and forward movement of the shaft will also be resisted by the governor springs 78 which springs will be of sufficient strength or tension to resist, within limits, undue distension of the governor arms while the engine is being accelerated. As soon as the foot is released from the accelerator pedal of the vehicle, however, and the torsional grip on the head 58 of the key shaft 56 is relieved, the driven shaft 62 will be turned under the accelerated momentum of the vehicle for accelerating the rotation of the governor with the result that the governor arms 70 will be expanded for shifting the key shaft 56 forwardly and moving the head 58 thereof out of engagement with the clutch sleeve 48 and into engagement with the clutch sleeve 42, putting the transmission in second gear.

An operation similar to that just described will take place when the transmission is in second speed and the vehicle engine is accelerated. In such instance, the key shaft 56 will, immediately upon the release of the torsional grip on the head 58 of said shaft, be shifted forwardly by the governor out of engagement with the clutch sleeve 42 and into engagement with the clutch sleeve 35 putting the transmission in high gear and, as will be appreciated in view of the foregoing description, the vehicle may free wheel when the transmission is in second gear or when in high gear. In this connection, attention is directed to the fact that the forward pressure exerted on the key shaft 56 by the governor will cause the head 58 of said shaft, assuming said head to be in engagement with the clutch sleeve 48, to press against the adjacent end of the clutch sleeve 42 and cause the clutch sleeve 42 to rotate at the same speed as the key shaft. A similar action will take place when the head 58 of the key shaft is engaged with the clutch sleeve 42. Forward pressure on the key shaft will then cause the head to press against the clutch sleeve 35 with the result that this sleeve will be caused to rotate at the same speed as the key shaft. Clashing between the head of the key shaft and the clutch sleeves will thus be avoided. Furthermore, similar results will follow when the key shaft is shifted rearwardly from one clutch sleeve to the next, and, in this connection, attention is directed to the fact that, as the speed of the driven shaft 62 is reduced, through a reduction in the speed of the vehicle, the springs 78 of the governor will retract the governor arms and, consequently, pull the key shaft rearwardly with the result that, assuming the transmission to be in high gear, the key shaft will be retracted until the transmission is in second gear and thence further retracted until the transmission is in low gear. Accordingly, as will be seen, I provide a mechanism wherein the selection of speed gears will be controlled by the speed of the vehicle, independently of engine speed and wherein the key shaft will be shifted automatically to select the different speed gears without the necessity of releasing the vehicle clutch, it being noted in this connection, however, that the key shaft cannot, as previously explained, be shifted while the engine is delivering power thereto. When in second speed, power will be communicated from the shaft 18 through the gears 19 and 29, the countershaft 25, the gears 30 and 22 and through the clutch sleeve 42 to the key shaft 56. When in high gear, power will be communicated from the shaft 18 through the gear 19 and clutch sleeve 35 to the key shaft.

As shall further be described, manually operable means are provided for shifting the key shaft rearwardly from low gear position, as shown in Fig. 1, into neutral position in which position the head 58 of the key shaft will lie within the recess 59, as well as also further shifting the key shaft rearwardly from neutral position into engagement with the reverse gear 24. To accomplish this rearward manual shifting of the key shaft, into neutral or reverse positions, it is first necessary, however, to release the governor sleeve 67 in order that the combined key shaft and governor unit provided by the key shaft 56, the governor and its parts and the sleeve 60 may be bodily shifted rearwardly.

It is now to be observed that when the lever 84 is rocked forwardly incident to release of the vehicle clutch, as previously described, the cam ring 79 will be shifted rearwardly on the head 54 of the sleeve 53. Accordingly, the pins 81 will be caused to ride up the cam slots 80 to the position shown in Fig. 6 and will thus be retracted out of the sockets 82 of the sleeve 67 for freeing said sleeve and releasing the combined key shaft and governor unit for rearward movement. Accordingly, by first depressing the clutch pedal of the vehicle and releasing the vehicle clutch, the combined key shaft and governor unit may then be manually shifted rearwardly from low gear position, as illustrated in Fig. 1, to neutral position, as previously described. Similarly, when the unit is free, said unit may be further manually shifted rearwardly to engage the head 58 of the key shaft with the reverse gear 24, as previously described. Power will then be transmitted from the shaft 18 through the gears 19 and 29, the countershaft 25 and the gears 32, 33 and 24 to the key shaft for counter-rotating the key shaft and, consequently, counter-rotating the driven shaft 62 for driving the vehicle backwardly. As the governor springs 78 will normally hold the sections of the governor arms 70 in alinement, as shown in Fig. 1, so that said arms will be rigid under endwise thrust, the manually operable means employed for shifting the combined key shaft and governor unit may be connected to the sleeve 60 and I shall now proceed to describe said manually operable means.

Closing the rear end portion of the casing is a rear cover 87 having a marginal flange 88 resting on the wall of the casing as well as on the partition 13, and rising from said cover, medially thereof, as seen in Fig. 1, is a boss 89 in which is mounted a spring pressed detent 90. Secured to the lower side of the cover at the front and rear of said detent are brackets 91 and slidable through said brackets is a shifter bar 92 provided at its forward end with a short pendent arm 93 having a lug 94 thereon and at its rear end with a long pendent arm 95 terminating in a yoke 96. Journaled by suitable bearings on the rear end of the sleeve 60 of the key shaft 56, as particularly seen in Fig. 1, is an externally grooved ring 97 engaged by the pins of the yoke 96 and securing the ring and bearings on the sleeve is a nut 98. The bar 92 is thus operatively connected to the sleeve 60 for imparting endwise movement to the combined key shaft and governor unit. Formed in the upper edge of the longitudinal reach of the bar 92 are notches 99 adapted to selectively receive the detent 90 for holding the bar in longitudinally adjusted position, there being a notch for each of the several positions of the key shaft 56.

Closing the forward end portion of the casing 10 is a front cover 100 having a marginal flange 101 resting on the walls of the casing as well as on the partition 13, both the front and rear covers being removably secured in position by suitable cap bolts. Near its forward end, the cover 100 is provided, as particularly seen in Figs. 1, 4 and 9 of the drawings, with a transverse offset 102 and extending in parallel relation to said offset across the rear end portion of the cover is a partition 103. Secured to the bottom face of the offset 102 and to the lower edge of the partition 103 are alined brackets 104 and slidable through said brackets and through suitable notches in the abutting portions of the flanges 88 and 101 of the front and rear covers at the partition 13 is a shifter bar 105 which, as seen in Fig. 1, is provided near its rear end with a notch accommodating the lug 94 on the arm 93 of the bar 92, the bar 105 and the bar 92 being thus operatively connected for endwise movement.

Figure 9:
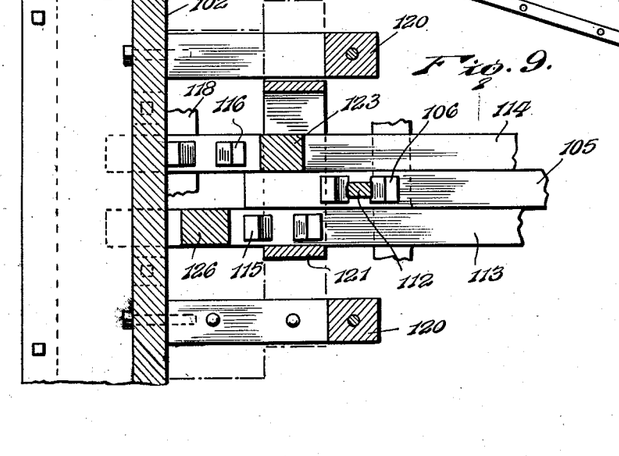
Fig. 9 is a detail section on the line 9—9 of Fig. 1.
Figure 10:
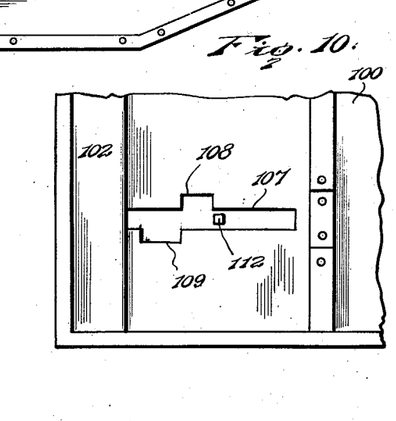
Fig. 10 is a detail bottom plan view showing the shift lever slot in the front cover.

Rising from the upper edge of the bar 105 at its forward end, as particularly seen in Figs. 1 and 9 of the drawings, is a pair of spaced lugs 106 having upwardly diverging inner faces and formed in the cover 100, above the forward end portion of the bar, is a longitudinally extending slot 107. As shown in Fig. 10, this slot is provided in one side thereof with a lateral notch 108 and in its opposite side with an oppositely extending lateral notch 109. Rising from the cover 100, over said slot, is a shift lever stand 110 provided at its upper end with a bearing 111 and journaled by said bearing is a shift lever 112 the lower end of which extends through the slot 107 and, as shown in Fig. 1, is normally engaged between the forks 106 of the shifter bar 105. The bearing 111 journals the shift lever not only for forward and rear rocking movement but also for lateral rocking movement and the upper half of the bearing is detachable, as shown, so that the lever may be readily removed.

Figure 11:
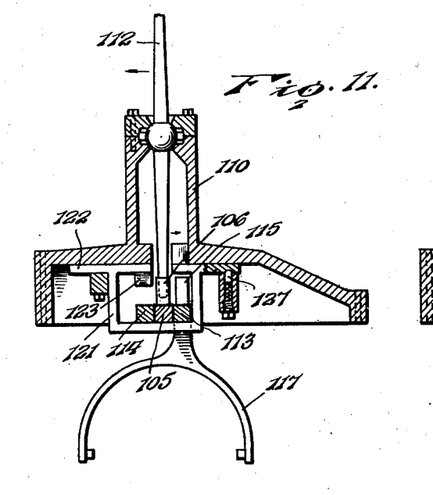
Fig. 11 is a section on the line 11—11 of Fig. 1.
Figure 12:
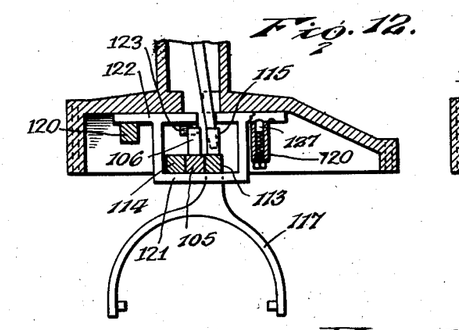
Fig. 12 is a view similar to Fig. 11 showing the shift lever rocked to engage the shifter bar for rendering the free wheeling clutch of the second speed gear inactive.

Slidable through the brackets 104, at opposite sides of the shifter bar 105, are shifter bars 113 and 114, the former of which is provided with spaced lugs 115 while the latter is provided with spaced lugs 116, these lugs being like the lugs 106. Depending from the bar 113, as particularly seen in Figs. 11 and 12, is a yoke 117 which, as brought out in Fig. 1, coacts with the locking ring 47, the pins of the yoke freely engaging in the external groove of said ring. Depending from the shifter bar 114 is a similar yoke 118, the pins of which engage in the external groove of the locking ring 40. Thus, the bar 113 may be shifted longitudinally for shifting the ring 47 while the bar 114 may be shifted for shifting the locking ring 40. Mounted in the partition 103, as brought out in Fig. 1, are spring pressed detents 119 engageable in suitable sockets in the upper edges of the bars 113 and 114 at their rear ends for holding the bars in set position, each of the bars being provided with a socket for its forward position and a like socket for its rear position.

Figure 4:
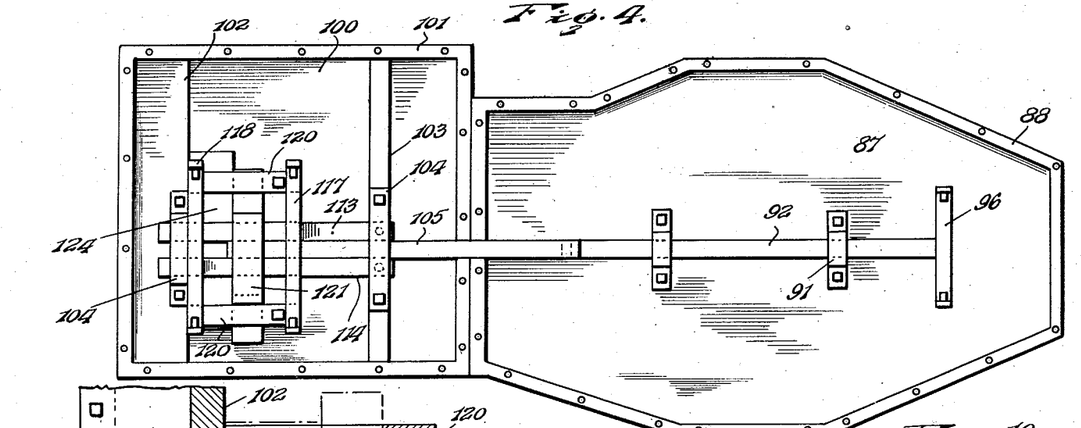
Fig. 4 is a bottom plan view of the covers.
Figure 13:
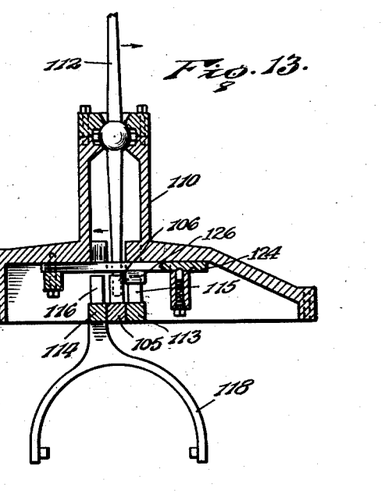
Fig. 13 is a detail section on the line 13—13 of Fig. 1.
Figure 15:
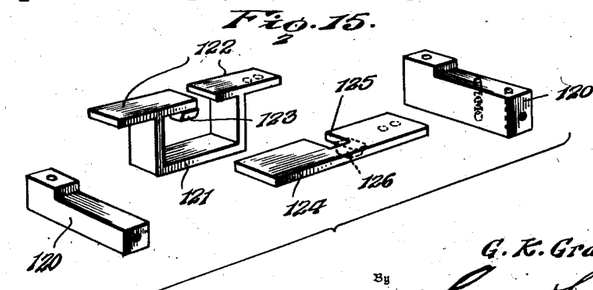
Fig. 15 is a detail perspective view showing the locking dogs for the shifter bar of the key shaft employed.

Secured to the top wall of the front cover 100 and to the offset 102, as particularly brought out in Figs. 4 and 9 of the drawings, are transversely spaced angle brackets 120 and supported by said brackets is a transversely slidable locking dog 121. As shown in detail in Fig. 15, this locking dog is substantially U-shaped and is provided with alined end plates 122 which rest on the brackets 120 and are spaced apart at their inner ends. Formed on the inner end of one of said plates is a depending lug 123. Slidable transversely on the brackets 120 in front of the locking dog 121 is a locking dog 124 which, as seen in Fig. 15, is in the nature of a flat plate. This dog is provided in its rear edge with a medial notch 125 and depending from the dog adjacent said notch is a lug 126. The dogs 121 and 124 lie side by side within the brackets 120. Mounted upon one of said brackets, as particularly seen in Figs. 11 and 13, are spring pressed detents 127 engageable in suitable sockets in the lower faces of the adjacent ends of the dogs for normally holding the dogs stationary.

Assuming now that the transmission is in low gear, as shown in Fig. 1, it will be seen that by depressing the clutch pedal of the vehicle and releasing the governor sleeve 67, as previously described, the shift lever 112 may be rocked forwardly at its upper end for shifting the bar 105 rearwardly and, consequently, shifting the bar 95 rearwardly for moving the combined key shaft and governor unit rearwardly from the position shown in Fig. 1 to neutral position, whereupon the head 58 of the key shaft 56 will be disposed within the recess 59. By then further rocking the upper end of the shift lever 112 forwardly, the combined key shaft and governor unit may be further shifted rearwardly, as will be seen, to engage the head 58 of the key shaft 56 with the reverse gear 24, so that the transmission will be in reverse. Rearward movement imparted to the upper end of the shift lever 112 will, of course, serve to shift the combined key shaft and governor unit forwardly so that the key shaft may be moved out of engagement with the reverse gear 24 to neutral position and from neutral position to engage the head 58 of the key shaft with the clutch sleeve 48 so that the transmission will again be in low gear.

Further assuming now that the transmission is in low gear, as shown in Fig. 1, it will be seen that after the vehicle has been started so that the governor arms 70 will be flexed outwardly somewhat from the position shown, the upper end of the shift lever 112 may be rocked rearwardly for carrying the bar 105 forwardly and shifting the key shaft 56 forwardly to engage the head 58 of said shaft with the clutch sleeve 42, thereby putting the transmission in second gear. Similarly, the upper end of the shift lever 112 may then be further rocked rearwardly for shifting the key shaft 56 forwardly and engaging the head 58 of said shaft with the clutch sleeve 35 to put the transmission in high gear. When the key shaft is thus manually shifted from low gear to second gear and from second gear to high gear, the sleeve 60 will be moved forwardly on the driven shaft 62 with the result that the governor arms 70 will be flexed outwardly against the tension of the springs 78, thereby permitting the forward movement of the key shaft 56. When rearward pull is exerted on the sleeve 60, through operation of the shift lever 112, such pull will, of course, tend to straighten the governor arms so that, as will be seen, the shift lever may be rocked for shifting the key shaft 56 rearwardly out of engagement with the clutch sleeve 35 from high gear position into engagement with the clutch sleeve 42 to second gear position and from second gear position into engagement with the clutch sleeve 48 to low gear position. Thus, the key shaft may be manually shifted to select the different speed gears.

When the key shaft 56 is shifted automatically by action of the governor, as previously described, corresponding rocking movement will, of course, be imparted to the shift lever 112 and it will now be assumed that said lever has been moved either manually or automatically to second gear position so that the head 58 of the key shaft 56 is engaged with the clutch sleeve 42. In this second gear position of the transmission, the lower end of the shift lever 112 will, as shown in Figs. 11 and 12 of the drawings, stand between the inner ends of the end plates 122 of the dog 121 opposite the notch 108 of the slot 107 while the lugs 106 of the bar 105 will stand opposite the lugs 115 of the bar 113. Consequently, the shift lever may be rocked laterally from the position shown in Fig. 11 to the position shown in Fig. 12 when the lower end of the lever will be moved out of engagement with the forks 106 into the notch 108 in engagement with the forks 115 of the bar 113. This lateral movement of the shift lever will serve, as shown in Fig. 12, to shift the dog 121 laterally so that the lug 123 of said dog will be moved between the lugs 106 of the bar 105 for locking this bar stationary and, consequently, locking the key shaft 56 in second gear position, as will be appreciated in view of the foregoing description.

After the shift lever 112 has been rocked laterally, as shown in Fig. 12, said lever may then be rocked forwardly at its upper end for shifting the bar 113 rearwardly and, consequently, shifting the locking ring 47 rearwardly into engagement with the teeth 46 of the clutch sleeve 42. Accordingly, this sleeve will be locked to the second speed gear 22 to turn in unison therewith so that the free wheeling clutch of the second speed gear will be rendered inactive.

Figure 14:
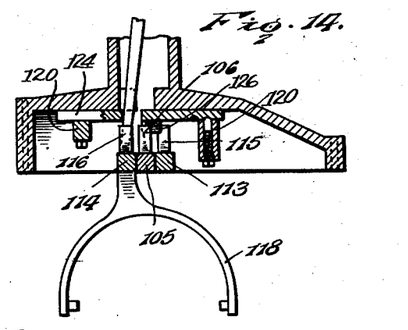
Fig. 14 is a view similar to Fig. 13 showing the shift lever rocked to engage the shifter bar for rendering the free wheeling clutch of the high speed gear inactive.

Movement of the shift lever reverse to that just described will, of course, serve to return the parts to their former positions whereupon the shift lever 112 will again stand vertically in engagement with the lugs 106 of the bar 105 so that the key shaft 56 may be shifted forwardly to engage the head 58 thereof with the clutch sleeve 35. In this position of the key shaft, the lower end of the shift lever 112 will be rocked into the notch 125 of the dog 124 and, as shown in Fig. 13, will stand opposite the notch 109 of the slot 107. Consequently, the shift lever may be rocked laterally from the position shown in Fig. 13 to dispose the lower end thereof in the notch 109 and move the shift lever out of engagement with the lugs 106 into engagement with the lugs 116 of the bar 114, as shown in Fig. 14. This lateral movement of the shift lever will serve to slide the dog 124 laterally and move the lug 126 of said dog into engagement with the lugs 106 whereupon the transmission will be locked in high gear. Accordingly, the shift lever 112 may then be rocked forwardly when the lower end of the lever will move in the notch 109 for shifting the bar 114 rearwardly and, consequently, moving the locking ring 40 into engagement with the teeth 39 of the clutch sleeve 35, locking said sleeve to turn in unison with the high speed gear 19. Thus, the free wheeling clutch of the high speed gear will be rendered inactive and, of course, movement of the shift lever reverse to that just described will return the parts to their original positions. I accordingly provide a mechanism wherein the free wheeling clutch of the second speed gear as well as the free wheeling clutch of the high speed gear may be selectively rendered inactive manually.

Having thus described the invention, I claim:

1. A free shift transmission including a driving shaft, speed gears axially with the driving shaft, a driven shaft axially alined with the driving shaft and the speed gears, a longitudinally shiftable key shaft having a driving connection with the driven shaft to impart motion to said shaft, and a governor connected with the key shaft operated at the speed of the driven shaft for shifting the key shaft longitudinally to select said gears, the key shaft being provided with means to engage selective gears and receive motion therefrom.

2. A free shift transmission including speed gears, a driven shaft alined axially with the gears, a longitudinally shiftable key shaft, a sleeve secured on the key shaft and slidable on the driven shaft and keyed thereto whereby motion will be imparted to the driven shaft from the key shaft, and a governor driven by said driven and key shafts for shifting the key shaft longitudinally to select said gears, the key shaft being constructed to engage the selected gear and receive motion therefrom.

3. A free shift transmisson including speed gears, free wheeling clutches driven by said gears, a driven shaft alined axially with the gears, a longitudinally shiftable key shaft having a driving connection with the driven shaft to impart movement to the said shaft, and a governor operated at the speed of the driven shaft for shifting the key shaft longitudinally to selectively engage said clutches and select and receive motion from the speed gears.

4. A free shift transmission including speed gears, free wheeling clutches driven by said gears, a driven shaft, a longitudinally shiftable key shaft having a driving connection with the driven shaft, a governor operated at the speed of the driven shaft for shifting the key shaft longitudinally to selectively engage said clutches and select the speed gears, and manually operable means for selectively rendering said clutches inactive.

5. A free shift transmission including a driving shaft, speed gears alined axially with the driving shaft, a counter shaft, gears fixed on the counter shaft and constantly meshing with the respective speed gears for driving the same, a driven shaft alined axially with the speed gears, a longitudinally shiftable key shaft having a driving connection at one end with the driven shaft to impart motion thereto and constructed at its opposite end to engage the respective speed gears, and a governor operated at the speed of the driven shaft for shifting the key shaft longitudinally to select the speed gears and receive motion therefrom, all the gears being held against endwise motion.

6. A free shift transmission including speed gears, a driven shaft, a longitudinally shiftable key shaft having a sleeve slidable on the driven shaft and keyed thereto, a sleeve slidable on the key shaft, means releasably anchoring the latter sleeve, and governor arms connected to said sleeves and operable on said first-mentioned sleeve for shifting the key shaft longitudinally and selecting said gears.

7. A free shift transmission including speed gears, a driven shaft, a longitudinally shiftable key shaft having a driving connection with the driven shaft, a governor carried by the key shaft, one end of the governor being operatively fixed to the key shaft, and means releasably anchoring the governor at its opposite end, the governor being operable for shifting the key shaft longitudinally and selecting said gears.

8. A free shift transmission including speed gears, a driven shaft, a longitudinally shiftable key shaft having a driving connection with the driven shaft, a governor carried by the key shaft, one end of the governor being operatively fixed to the key shaft, means releasably anchoring the governor at its opposite end, the governor being operable for shifting the key shaft longitudinally and selecting said gears, and means for shifting the key shaft and governor as a unit when the latter end of the governor is released.

9. A free shift transmission including speed gears, a driven shaft, a longitudinally shiftable key shaft having a driving connection with the driven shaft, a governor carried by the key shaft and operable for shifting the key shaft longitudinally to select said gears, said governor being operatively fixed at one end to the key shaft and provided at its opposite end with a sleeve carried by the key shaft, a sleeve receiving the key shaft therethrough and fixed against endwise movement, the latter sleeve being provided with a head normally receiving an end of said governor sleeve, pins carried by said head and normally engaging said governor sleeve for anchoring the governor at the adjacent end thereof, and a ring carried by said head and having cam slots coacting with said pins, said ring being shiftable for retracting the pins and freeing said governor sleeve.

10. A free shift transmission including speed gears, a driven shaft, a longitudinally shiftable key shaft having a driving connection with the driven shaft, a governor carried by the key shaft and operable for shifting the key shaft longitudinally to select said gears, means releasably anchoring the governor at one end, and a shift lever operatively connected with the key shaft and operable for shifting the key shaft and governor as a unit when the governor is freed.

11. A free shift transmission including speed gears, a driven shaft, a longitudinally shiftable key shaft having a driving connection with the driven shaft, a governor carried by the key shaft and responsive to the speed of the driven shaft for shifting the key shaft longitudinally to select said gears, and manually operable means for shifting the key shaft longitudinally independently of the governor to select said gears.

12. A free shift transmission including a driving shaft, speed gears alined axially with the driving shaft, free wheeling clutches driven by said gears including clutch sleeves disposed axially of the gears, a driven shaft alined axially with the driving shaft and the speed gears, a longitudinally shiftable key shaft having a driving connection with the driven shaft whereby motion will be transmitted from the key shaft to the driven shaft, a governor carried by the key shaft and responsive to speeds of the driven shaft for shifting the key shaft longitudinally, and a head on the key shaft engageable in the sleeves as the key shaft is shifted for selecting and receiving motion from said gears.

13. A free shift transmission including speed gears, free wheeling clutches driven by said gears including clutch sleeves disposed axially of the gears and provided with flanges, locking rings carried by the gears and shiftable to engage said flanges for coupling the sleeves and gears to turn in unison and rendering said clutches inactive, a driven shaft, a longitudinally shiftable key shaft having a driving connection with the driven shaft, and a governor carried by the key shaft for shifting said key shaft longitudinally from each clutch sleeve to the next sleeve and selecting said gears.

14. A free shift transmission including speed gears, free wheeling clutches driven by said gears, manually operable means for locking the gears and clutches to turn in unison and rendering said clutches inactive, a driven shaft, a longitudinally shiftable key shaft having a driving connection with the driven shaft, a shifter bar for shifting the key shaft longitudinally and into selective engagement with said clutches for selecting the speed gears, shifter bars connected with said manually operable means, a shift lever for moving all of said bars selectively, and dogs selectively operable by the shift lever for locking said first-mentioned bar when the shift lever is engaged with either of said second-mentioned bars.

GEORGE K. GRABBE. [L. S.]